May 22, 1956  J. ANDERSON  2,746,237
CLOCK AND CASING THEREFOR
Filed Aug. 20, 1952
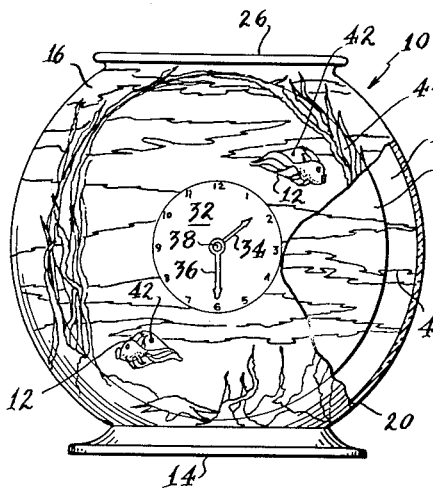
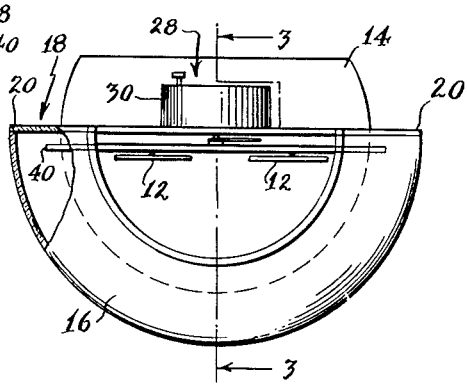
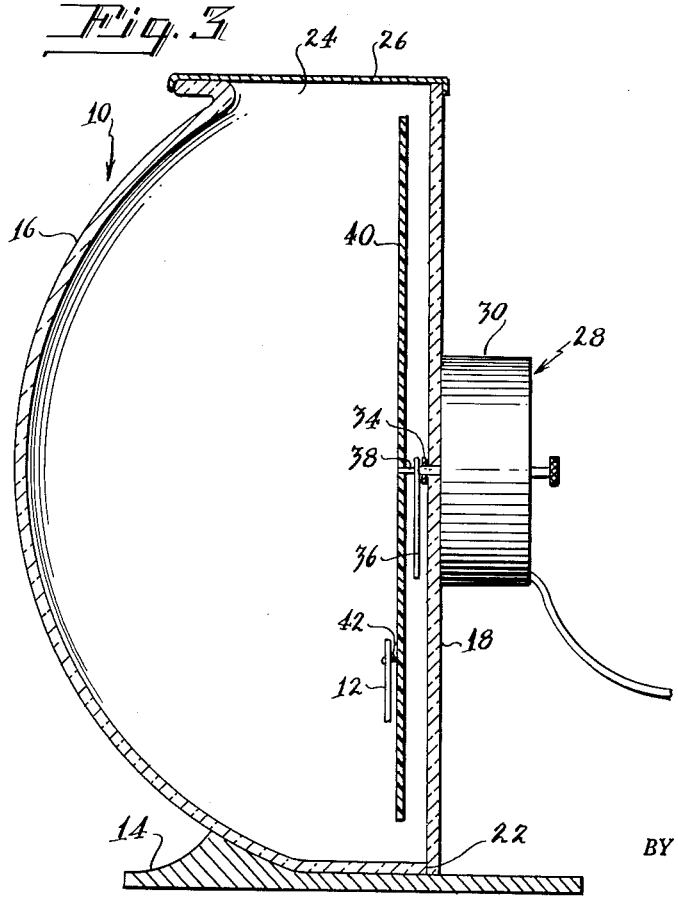
INVENTOR.
John Anderson
BY

# United States Patent Office 2,746,237
Patented May 22, 1956

2,746,237

CLOCK AND CASING THEREFOR

John Anderson, New York, N. Y., assignor to Gait Anderson Company, White Plains, N. Y., a copartnership Application August 20, 1952, Serial No. 305,449

4 Claims. (Cl. 58—56)

The present invention relates, in general, to timepieces or clocks, and, in particular, to mountings therefor.

The primary object of the present invention is the provision of a clock mounting provided with a simulated natural habitat of living bodies, wherein replicas of said living bodies appear to be animate.

Another object is the provision of means for utilizing a clockwork mechanism to animate replicas of living bodies in a simulated natural habitat of said bodies.

A further object is the provision of a simulated fish bowl clock-mounting decorated to represent an aquatic setting and provided with a timepiece having a clockface visible therein, the clockwork mechanism of said timepiece being utilized to animate replicas of fish within said setting.

The above and other objects, features and advantages of the present invention will be more readily understood from the following description considered in connection with the accompanying illustrative drawings.

In the drawings:

Fig. 1 is a front elevation of a fishbowl clock mounting pursuant to the present invention, part thereof being in broken section;

Fig. 2 is a top plan view of the mounting with part broken away and with the upper wall or closure removed; and Fig. 3 is a sectional elevation, on a larger scale, taken on the line 3—3 of Fig. 2.

Referring now to the drawings in detail, there is illustrated a clock mounting constituted by an enclosure 10 provided with members 12 which are mounted for movement therein and which comprise replicas of living bodies. In the illustrative embodiment of the invention, the enclosure 10 is in the form of a fishbowl and the replicas 12 represent fish. However, it will be understood that it is within the scope of the present invention to provide replicas 12 for living bodies other than fish, for example, and not by way of limitation, the replicas may represent birds or suitable members of the animal kingdom, in which case the enclosure 10 would be in a form suitable to the particular species represented.

As herein illustrated, the mounting 10 is provided with a suitable base member or support 14 which mounts the semi-circular bowl-like front wall member 16 and the planar rear wall member 18. Said front and rear walls abut at their side edges, as at 20—20, and at their bottom edges, as at 22. Said walls are spaced at their upper edges to provide an entrance 24 for the enclosure 10, and the upper wall 26 constitutes a closure therefor.

A timepiece 28, here shown as an electric-clock, is suitably mounted in the rear wall 18. More specifically, the clock casing 30, which contains the clockwork mechanism, projects from the outer surface of said wall and the clockface 32 is disposed in the plane thereof. The usual hour and minute hands 34 and 36, respectively, are provided for rotation relative to the clockface. Provision is also made for the customary second hand shaft 38, operated by the clock mechanism. However, in place of a second hand, a circular member 40 is mounted on shaft 38, forwardly of the clock face, for rotation thereby.

Member 40 is formed of a suitable transparent material, such as, for example and not by way of limitation, clear glass or a colorless transparent plastic. Member 40 is devoid of decoration so that the clock face 32 and the rear wall 18 are visible therethrough. Pivot pins 42 are suitably mounted in the member 40, being offset from the center thereof and extending from the front surface thereof to pivotally loosely mount the aforementioned fish replicas 12 outwardly of the periphery of the clock face.

The replica members 12 are formed of a suitable, preferably lightweight sheet material. Each member 12 is shaped to represent a living body, a replica of which is portrayed thereon in a suitable manner. For example, and not by way of limitation, the living bodies may be represented by a photograph, a painting, a drawing, etc. In the present embodiment of the invention, the replicas 12 represent fish.

The pivots 42 engage the replicas 12 at a point adjacent the upper edge thereof, which point lies along the vertical center line thereof and is offset from the horizontal center line thereof. Consequently, as the member 40 is rotated by the clock mechanism, the replicas 12 rotate about the clock face 32 and remain upright from the force of gravity, appearing to float through water. By permitting some friction to exist in the pivotal mountings 42, the replicas 12 may make spasmodic movements as they adjust to new positions on said pivots, which movements are representative of the normal motion of living bodies such as fish and creates the illusion of a real aquarium containing fish swimming therein.

In order to make said animation more realistic, the enclosure is suitably decorated to represent the natural habitat of the particular living bodies represented by the replicas. In this connection, the front wall 16 is formed of a suitable transparent material, such as, for example and not by way of limitation, clear glass or transparent plastic, and is decorated in a suitable manner, as at 44, about the outer marginal area thereof. The central area of the front wall is devoid of decoration or decorative material to permit an unobstructed view of the clock face 32, the replicas 12 as they move in their orbits and of the rear wall 18. In the present embodiment, since the members 12 are replicas of fish, the decoration 44 illustrates an aquatic habitat. The rear wall 18 constitutes a background for the replicas and is also suitably decorated, as at 46, to complete the aquatic habitat of the presently described embodiment of the invention. The entire rear wall is preferably transparent, as shown, except for its decorations 46.

From the foregoing, it will be apparent that when the clock 28 is in operation, the member 40 will be rotated thereby to rotate the fish replicas 12 about the clock face. As shown in Fig. 1, the edge of disc 40 is concealed from view by masking means such as the decorations 44 on the front wall. Thus the supporting means for the replicas 12 are substantially invisible which heightens the illusion of fish swimming in water. As each replica adjusts to a new level, it pivots about its mounting pin to provide a spasmodic movement representative of the movement of a living body. To an observer wishing to note the time, the clock face will appear to be disposed within the center of a living scene, thereby providing a highly novel, unusual and decorative surrounding therefor.

It will be readily apparent that the described device is well adapted to fulfill the objects previously set forth.

While the member 40, which mounts the replicas 12, has been illustrated and described as being rotated by the second hand shaft of the clockwork mechanism, it will be understood that it is within the scope of the invention to mount member 40 on any other shaft that is driven by the clockwork mechanism, which shaft may be suitably geared to provide a desired speed of rotation for member 40.

While I have shown and described the presently preferred embodiment of my invention, it will be understood that various changes may be made in the present invention without departing from the underlying idea or principles of the invention within the scope of the appended claims.

Having thus described my invention, what I claim and desire to secure by Letters Patent, is:

1. A clock mounting comprising, in combination, a transparent front wall, a rear wall joined to the periphery of said front wall, at least one of said walls being shaped to provide a space between said walls extending close to said periphery, a clock having a dial mounted centrally of said rear wall and substantially smaller than said rear wall, said dial being visible through said front wall, said clock having a central rotating shaft extending into said space, a transparent circular disc mounted on said shaft for rotation therewith, and a replica of a living creature pivotally supported on said disc above its center of gravity at a point on the disc beyond the periphery of said dial, said front wall having masking means peripherally positioned to conceal the edge of said disc from the view of an observer of said clock dial, whereby as said dial rotates said replica appears to move through said space independently of any support.

2. The clock mounting of claim 1 wherein said replica is supported on the face of said transparent disc toward said front wall, whereby its pivotal attachment to said disc is concealed from the view of an observer of the clock.

3. The clock mounting of claim 1 wherein said rear wall is of transparent material.

4. The clock mounting of claim 3 wherein said rear wall is provided with masking means peripherally positioned to conceal the edge of said transparent disc.

References Cited in the file of this patent
UNITED STATES PATENTS

| Number | Name | Date |
|---|---|---|
| 296,912 | Bishop | Apr. 15, 1884 |
| 633,821 | Edwardy | Sept. 26, 1899 |
| 1,926,467 | Vernon | Sept. 12, 1933 |
| 2,082,612 | Bourquin | June 1, 1937 |
| 2,102,474 | McKenna | Dec. 14, 1937 |
| 2,167,463 | Register | July 25, 1939 |
| 2,554,063 | Serrine | May 22, 1951 |